(12) United States Patent
Wang

(10) Patent No.: US 9,851,831 B2
(45) Date of Patent: Dec. 26, 2017

(54) TOUCH SCREEN, DRIVING METHOD THEREOF AND DISPLAY DEVICE

(71) Applicant: BOE Technology Group Co., Ltd., Beijing (CN)

(72) Inventor: Xiaolin Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 190 days.

(21) Appl. No.: 14/355,094

(22) PCT Filed: Jun. 18, 2013

(86) PCT No.: PCT/CN2013/077427
§ 371 (c)(1),
(2) Date: Apr. 29, 2014

(87) PCT Pub. No.: WO2014/153858
PCT Pub. Date: Oct. 2, 2014

(65) Prior Publication Data
US 2015/0205428 A1 Jul. 23, 2015

(30) Foreign Application Priority Data

Mar. 29, 2013 (CN) .......................... 2013 1 0108303

(51) Int. Cl.
*G06F 3/041* (2006.01)
*G06F 3/044* (2006.01)
(52) U.S. Cl.
CPC ............ *G06F 3/0416* (2013.01); *G06F 3/044* (2013.01); *G06F 3/0412* (2013.01); *G06F 2203/04112* (2013.01)
(58) Field of Classification Search
CPC ...... G06F 3/0412; G06F 3/0416; G06F 3/044; G06F 3/038; G06F 17/5031;

(Continued)

(56) References Cited

U.S. PATENT DOCUMENTS 8,552,989 B2 * 10/2013 Hotelling et al. ............ 345/173
2013/0147741 A1 * 6/2013 Low ...................... G06F 3/0416
345/173

(Continued)

OTHER PUBLICATIONS

International Preliminary Report on Patentability Appln. No. PCT/CN2013/077427; dated Sep. 29, 2015.

*Primary Examiner* — Amare Mengistu
*Assistant Examiner* — Shawna Stepp Jones
(74) *Attorney, Agent, or Firm* — Ladas & Parry LLP; Loren K. Thompson

(57) ABSTRACT

A touch screen, a driving method thereof and a display device. Common electrodes (9) of at least part of pixel units (5) on an array substrate (1) form a plurality of touch driving electrodes (3) each comprising at least one common electrode (9); the plurality of touch driving electrodes (3) are grouped into a plurality of touch driving electrode groups (101, 102) each comprising at least one touch driving electrode (3), and a plurality of touch sensing electrodes (4) are formed on a color filter substrate (2), the touch driving electrodes (3) and the touch sensing electrodes (4) are disposed to be intersected horizontally and vertically. Further, a driving circuit (10) is further provided, during a display period in a display time for one frame of picture, a common electrode signal is transferred by the driving circuit (10) to all of the touch driving electrodes (3), while during a touch period in the display time for the one frame of picture, a touch scan signal is only transferred by the driving circuit (10) to the respective touch driving electrodes in one of the touch driving electrode groups (101, 102).

16 Claims, 2 Drawing Sheets

(58) Field of Classification Search
CPC ... G09G 2310/0205; G09G 2310/0243; G09G 2310/0283
See application file for complete search history.

(56) References Cited

U.S. PATENT DOCUMENTS

2013/0215075 A1* 8/2013 Lee et al. ...................... 345/174
2013/0342479 A1* 12/2013 Pyo et al. ..................... 345/173

* cited by examiner

TOUCH SCREEN, DRIVING METHOD THEREOF AND DISPLAY DEVICE

CROSS REFERENCE TO RELATED APPLICATIONS

This application is based on International Application No. PCT/CN2013/077427 filed on Jun. 18, 2013, which claims priority to Chinese National Application No. 201310108303.0 filed on Mar. 29, 2013. The entire contents of each and every foregoing application are incorporated herein by reference.

TECHNICAL FIELD

The present disclosure relates to a field of display technique, and in particular to a touch screen, a driving method thereof and a display device.

BACKGROUND

In a touch screen technique, a capacitive touch screen is advantageous in terms of a long lifespan, a high transmittance, an ability of supporting a multi-point touch, etc, as compared with a resistive touch screen. Also, the capacitive touch screen has a perfect inhibitory effect on noises and an earth parasitic capacitance. Therefore the capacitive touch screen has been popular in manufacture of touch screen. Further, an In-Cell capacitive touch screen may not only thin a thickness of a display module but also reduce a manufacture cost of the touch screen greatly by embedding touch electrodes inside a display screen in the display module, and is favored by many panel producers.

A touch detection principle of the capacitive touch screen is as follows: touch driving electrodes and touch sensing electrodes which are arranged as being intersected with each other horizontally and vertically are formed in the touch screen, capacitors are formed at intersections so as to from a capacitor array, then a touch scan signal is applied to respective lines of touch driving electrodes sequentially, and output signals from the touch sensing electrodes corresponding to each line of touch driving electrodes are detected sequentially, so that capacitance variation in the capacitor array may be detected and a touch position may be judged.

Because of the requirement for adding the touch driving electrodes and the touch sensing electrodes on the display screen, a frame width of an entire display module may increases. In addition, since a display time for one frame of image includes a touch detection period and a charging and displaying period of the pixel unit, a charging time for a pixel unit is shortened extremely, which increases a design difficulty of the pixel unit.

SUMMARY

Problems to be Solved

Problems to be solved by the present disclosure is to provide a touch screen, a driving method thereof and a display device, which may increase a charging time of a pixel unit as each frame of picture is displayed and reduce a design difficulty of the pixel unit.

Technique Solutions

In order to settle the above technique problems, in the present disclosure, there is provided a touch screen comprising a color filter substrate, an array substrate and a liquid crystal layer disposed between the array substrate and the color filter substrate, a plurality of pixel units which are arranged in a matrix are formed on the array substrate, the pixel unit comprises thin film transistors, a pixel electrode and a common electrode, characterized in that the common electrodes of at least part of the plurality of the pixel units on the array substrate constitute a plurality of touch driving electrodes each comprising at least one common electrode; the plurality of the touch driving electrodes are grouped into a plurality of touch driving electrode groups each comprising at least one touch driving electrode; and a plurality of touch sensing electrodes are formed on the color filter substrate; wherein the touch driving electrode and the touch sensing electrodes are disposed to be intersected horizontally and vertically; the touch screen further comprises a driving circuit for transferring a common electrode signal to all of the touch driving electrodes during a display period in a display time for one frame of picture, and only transferring a touch scan signal to the respective touch driving electrodes in one of the touch driving electrode groups sequentially during a touch period in the display time for the one frame of picture.

In an example, the plurality of touch driving electrodes are grouped into a first touch driving electrode group and a second touch driving electrode group.

In an example, each of the touch driving electrodes is arranged in a row direction of the pixel units, while each of the touch sensing electrodes is arranged in a column direction of the pixel units; the first touch driving electrode group comprises all of the touch driving electrodes in odd rows; while the second touch driving electrode group comprise all of the touch driving electrodes in even rows.

In an example, each of the touch driving electrodes is electrically connected with a drain of a corresponding switching thin film transistor; sources of two switching thin film transistors corresponding to a touch driving electrode in an odd row and a touch driving electrode in an even row, which are adjacent, respectively, are electrically connected with each other and share one touch scan line; the driving circuit comprises a touch switching driving circuit and a touch scan driving circuit; the touch switching driving circuit is connected with gates of the respective switching thin film transistors and is used for transferring a touch switching signal to the gates of the respective switching thin film transistors to control turning on and off the switching thin film transistors; the touch scan driving circuit is connected with the touch scan lines, and transfers the common electrode signal to all of the touch driving electrodes during the display periods in the display time for two consecutive frames of pictures while transfers the touch scan signal to the respective touch driving electrodes in the first touch driving electrode group and the second touch driving electrode group sequentially, respectively, during the touch periods in the display time for the two consecutive frames of pictures.

In an example, the gates of the switching thin film transistors corresponding to all of the touch driving electrodes in the odd rows share a first touch switching line; while the gates of the switching thin film transistors corresponding to all of the touch driving electrodes in the even rows share a second touch switching line.

In the present disclosure, there is further provided a display device comprising the touch screen described above.

Meanwhile, in the present disclosure, there is further provided a driving method for the touch screen described above in which a plurality of touch driving electrodes are grouped into a plurality of touch driving electrode groups in accordance with a certain rule, the driving method comprises: dividing a display time for one frame of picture on a touch screen into a display period and a touch period; during the display period in the display time for the one frame of picture, applying a common electrode signal to each of the touch driving electrodes in the touch screen and applying a low level signal to the touch sensing electrodes; and during the touch period in the display time for the one frame of picture, only applying a touch scan signal to the respective touch driving electrodes in one of the touch driving electrode groups sequentially, and the touch sensing electrodes coupling the voltage signal of the touch scan signal and output coupled signals.

In an example, the plurality of touch driving electrodes are grouped into a first touch driving electrode group and a second touch driving electrode group in accordance with the certain rule; wherein, in the display time for two consecutive frames of pictures: the common electrode signal is applied to each of the touch driving electrodes in the touch screen while the low level signal is applied to the touch sensing electrodes during the display period in the display time for the first frame of picture; the touch scan signal is only applied to the respective touch driving electrodes in the first touch driving electrode group sequentially while the touch sensing electrodes couple the voltage signal of the touch scan signal and output the coupled signals during the touch period in the display time for the first frame of picture; the common electrode signal is applied to each of the touch driving electrodes in the touch screen while the low level signal is applied to the touch sensing electrodes during the display period in the display time for the second frame of picture; the touch scan signal is only applied to the respective touch driving electrodes in the second touch driving electrode group sequentially while the touch sensing electrodes couple the voltage signal of the touch scan signal and output the coupled signals during the touch period in the display time for the second frame of picture.

In an example, the case that the plurality of the touch driving electrodes are grouped into the first touch driving electrode group and the second touch driving electrode group comprises: each of the touch driving electrodes are arranged in a row direction of the pixel units, all of the touch driving electrodes in odd rows are grouped as the first touch driving electrode group and all of the touch driving electrodes in even rows are grouped as the second touch driving electrode group.

In an example, in the touch screen, each of the touch driving electrodes is electrically connected with a drain of a corresponding switching thin film transistor, sources of two switching thin film transistors corresponding to a touch driving electrode in an odd row and a touch driving electrode in an even row, which are adjacent, respectively, are electrically connected with each other and share one touch scan line; wherein in the display time for two consecutive frames of pictures, the switching thin film transistors corresponding to all of the touch driving electrodes in the odd rows are controlled to be turned on and the touch scan signal is transferred to the respective touch driving electrodes in the first touch driving electrode group through the touch scan lines sequentially during the touch period in the display time for the odd frame of picture; the switching thin film transistors corresponding to all of the touch driving electrodes in the even rows are controlled to be turned on and the touch scan signal is transferred to the respective touch driving electrodes in the second touch driving electrode group through the touch scan lines sequentially during the touch period in the display time for the even frame of picture.

In an example, during the touch period in the display time for the odd frame of picture, a touch switching signal is transferred to the gates of the switching thin film transistors corresponding to all of the touch driving electrodes in the odd rows through a first touch switching line so as to turn on the switching thin film transistors corresponding to all of the touch driving electrodes in the odd rows; and during the touch period in the display time for the even frame of picture, the touch switching signal is transferred to the gates of the switching thin film transistors corresponding to all of the touch driving electrodes in the even rows through a second touch switching line so as to turn on the switching thin film transistors corresponding to all of the touch driving electrodes in the even rows.

Benefit Effects

In the touch screen, the driving method thereof and the display device according to the present disclosure, the common electrodes of at least part of the pixel units on the array substrate form the plurality of touch driving electrodes each comprising at least one common electrode; the plurality of touch driving electrodes are grouped into the plurality of touch driving electrode groups each comprising at least one touch driving electrode, and the plurality of touch sensing electrodes are formed on the color filter substrate, wherein the touch driving electrodes and the touch sensing electrodes are disposed to be intersected horizontally and vertically, coupling capacitors are formed at the intersections, and each of the coupling capacitors corresponds to a touch detection point. Further, the driving circuit is further provided, so that during the display period in the display time for the one frame of picture, the driving circuit transfers the common electrode signal to all of the touch driving electrodes in order that the picture is displayed, while during the touch period in the display time for the one frame of picture, the driving circuit only transfers the touch scan signal to the respective touch driving electrodes in one of the touch driving electrode groups sequentially in order to perform touch detection on touch detection points corresponding to the touch driving electrode group, and the touch sensing electrodes are used for coupling the voltage of the touch scan signal and outputting the coupled voltage signals, thus a position of a touch point may be determined by detecting the voltage signal. The touch detection is performed on only the touch detection points corresponding to one of the touch driving electrode groups in the display time for the one frame of picture, therefore the charging time of the pixel units in the display time for the one frame of picture is increased and the design difficulty of the pixel unit is reduced.

Reference signs: 1—array substrate; 2—color filter substrate; 3—touch driving electrode; 4—touch sensing electrode; 5—pixel electrode; 6—liquid crystal layer; 7—switching thin film transistor; 8—passivation layer; 9—common electrode; 10—driving circuit; 11—touch switching driving circuit; 12—touch scan driving circuit; 13—touch scan line; 14—detection circuit; 15—first touch switching line; 16—second touch switching line; 17—substrate base; 101—first touch driving electrode group; 102—second touch driving electrode group; 301—touch sensing electrode in odd row; 302—touch sensing electrode in even row.

DETAILED DESCRIPTION

Detailed implementations of the present disclosure will be further described in details below in connection with the accompanying drawings and embodiments. Following embodiments are only used to illustrate the present disclosure, and in no way to limit a scope of the present disclosure.

Embodiment 1

Figure 1:
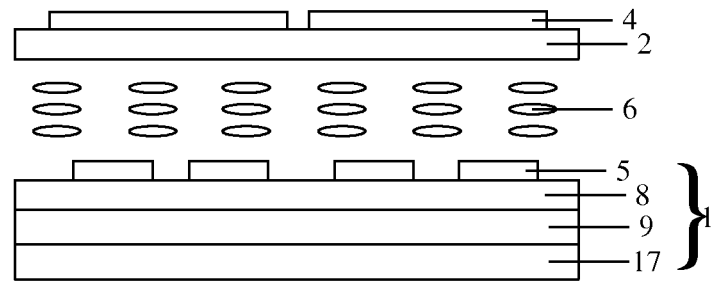
FIG. 1 is an exemplary longitudinal sectional view illustrating a touch screen according to embodiments of the present disclosure.
Figure 2:
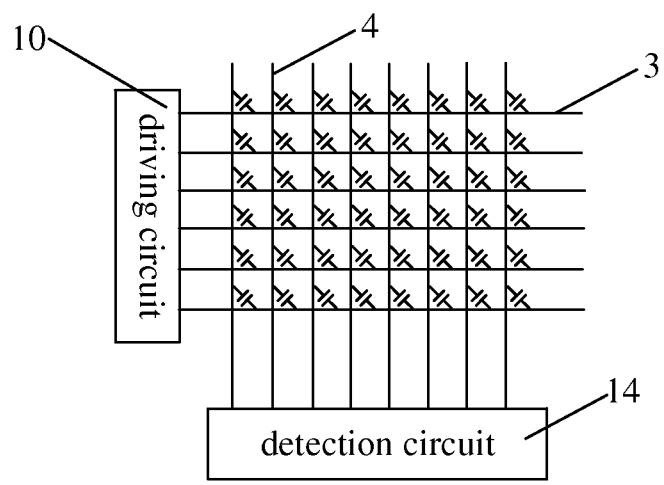
FIG. 2 is a first exemplary diagram illustrating an operation principle of the touch screen according to the embodiments of the present disclosure.

FIG. 1 is an exemplary longitudinal sectional view illustrating a touch screen according to embodiments of the present disclosure, and FIG. 2 is an exemplary diagram illustrating an operation principle of the touch screen according to the embodiments of the present disclosure. Referring to FIGS. 1 and 2 together, the touch screen according to the present embodiment particularly comprises an array substrate 1, a color filter substrate 2 and a liquid crystal layer 6 disposed between the array substrate 1 and the color filter substrate 2. The array substrate 1 comprises a substrate base 17 and a plurality of pixel units formed on the substrate base 17, which are arranged in a matrix, the pixel unit comprises thin film transistors, a pixel electrode 5 and a common electrode 9, and a passivation layer 8 is formed between the pixel electrode 5 and the common electrode 9, herein, the common electrode 9 may be above the pixel electrode 5, or be below the pixel electrode 5 as illustrated in FIG. 1.

Because a precision of the touch screen generally has an order of millimeter while a precision of a display screen generally has an order of micron, the common electrodes of at least part of the plurality of the pixel units, which are arranged in the matrix, on the array substrate 1 may be used to constitute a plurality of touch driving electrodes 3, each touch driving electrode 3 may comprise at least one common electrode 9. Further, the plurality of touch driving electrodes 3 are grouped into a plurality of touch driving electrode groups each comprising at least one touch driving electrode 3. A plurality of touch sensing electrodes 4 are formed on the color filter substrate 2 (the touch sensing electrode 4 may be formed on a side, which faces to the liquid crystal layer 6, of the color filter substrate 2, or also may be formed on a side, which is back to the liquid crystal layer 6, of the color filter substrate 2). In an example, the touch driving electrodes 3 and the touch sensing electrodes 4 are disposed to be intersected horizontally and vertically, coupling capacitors are formed at intersections, as illustrated in FIG. 2, and each of the coupling capacitors corresponds to a touch detection point.

The touch screen further comprises a driving circuit 10. During a display period in a display time for one frame of picture, the driving circuit 10 transfers a common electrode signal to all of the touch driving electrodes 3 in order that the picture is displayed; and during a touch period in the display time for the one frame of picture, the driving circuit 10 only transfers a touch scan signal to one of the touch driving electrode groups so that touch detection is performed on the touch detection points corresponding to the touch driving electrode group, the touch sensing electrode 4 is used to couple a voltage signal of the touch scan signal and output a coupled voltage signal, and a detection circuit 14 (generally is an amplifying circuit) detects the voltage signal and determines a position at which the touch point locates. The present disclosure may decrease touch detection time in the display time for the one frame of picture, so that a charging time for the pixel electrodes 5 may be increased and a design difficulty of the pixel electrodes 5 is reduced. Meanwhile, a low level signal may be applied to the touch driving electrodes 3 in other touch driving electrode groups, which may reduce interference to the touch detection on the touch detection points corresponding to the touch driving electrode group. In the present embodiment, the touch scan signal may be applied to the respective touch driving electrode groups sequentially in order to complete the touch detection on all of the touch detection points during the touch periods in the display time for a plurality of consecutive frames of pictures.

Figure 4:
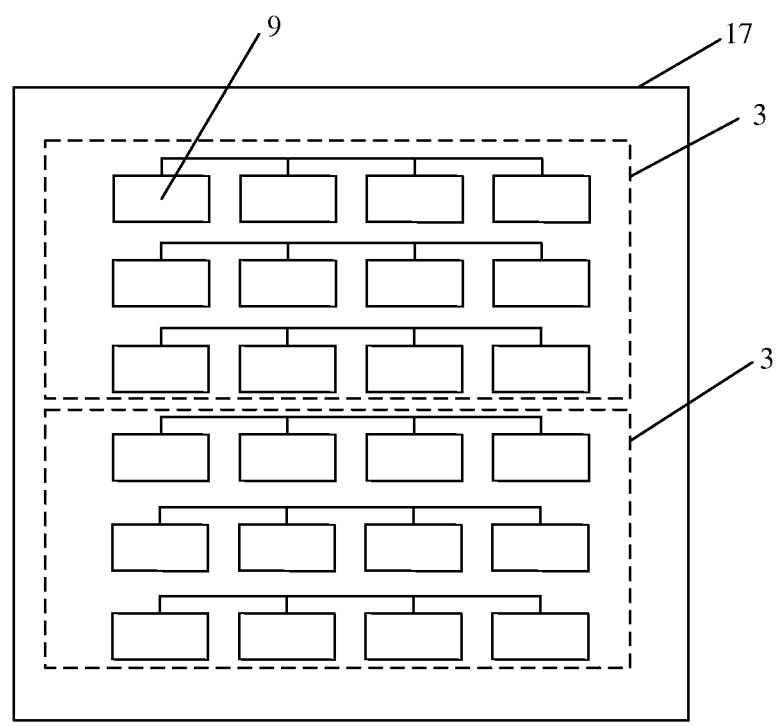
FIG. 4 is an exemplary top view illustrating an array substrate in the touch screen according to the embodiments of the present disclosure.

Similarly, because the precision of the touch screen generally has the order of millimeter while the precision of the display screen generally has the order of micron, one touch driving electrode 3 is generally composed of more than one common electrodes 9, as illustrated in FIG. 4.

In the touch screen according to the present embodiment, the common electrodes of at least part of the pixel units on the array substrate form the plurality of touch driving electrodes each comprising at least one common electrode; the plurality of touch driving electrodes are grouped into the plurality of touch driving electrode groups each comprising at least one touch driving electrode, and the plurality of touch sensing electrodes are formed on the color filter substrate, the touch driving electrodes and the touch sensing electrodes are disposed to be intersected horizontally and vertically, coupling capacitors are formed at the intersections, and each of the coupling capacitors corresponds to a touch detection point. Further, the driving circuit is further provided, so that during the display period in the display time for the one frame of picture, the driving circuit transfers the common electrode signal to all of the touch driving electrodes in order that the picture is displayed, while during the touch period in the display time for the one frame of picture, the driving circuit only transfers the touch scan signal to one of the touch driving electrode groups in order to perform touch detection on touch detection points corresponding to the touch driving electrode group, and the touch sensing electrodes are used for coupling the voltage of the touch scan signals and outputting a coupled voltage signal, thus a position of a touch point may be determined by detecting the voltage signal. The touch detection is performed on only the touch detection points corresponding to one of the touch driving electrode groups in the display time for the one frame of picture, therefore the charging time of the pixel units in the display time for the one frame of picture is increased and the design difficulty of the pixel units is reduced.

Figure 3:
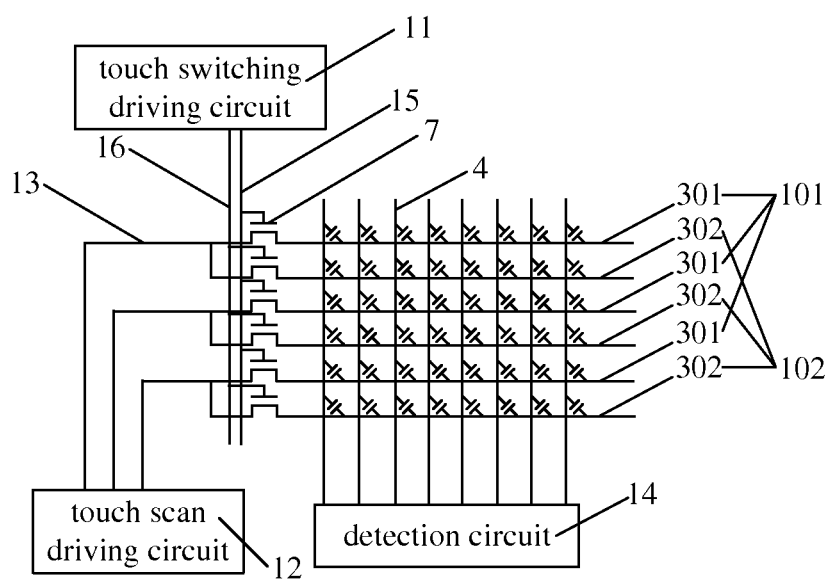
FIG. 3 is a second exemplary diagram illustrating the operation principle of the touch screen according to the embodiments of the present disclosure.

Furthermore, referring to FIG. 3, in order to ensure touch detection precision for the touch detection point, preferably the touch detection on all of the touch detection points is completed in the display time for two consecutive frames of pictures, that is to say, the plurality of touch driving electrodes are grouped into a first touch driving electrode group 101 and a second touch driving electrode group 102. In the display time for two consecutive frames of pictures (obviously one frame therein is an odd frame of picture while the other one is an even frame of picture):

during a display period in the display time for the odd frame of picture, the driving circuit transfers the common electrode signal to the first touch driving electrode group 101 and the second touch driving electrode group 102, while during a touch period in the display time for the odd frame of picture, the driving circuit applies the touch scan signal only to the first touch driving electrode group 101, the touch sensing electrodes 4 couple the voltage signal of the touch scan signal and output the coupled voltage signals; during a display period in the display time for the even frame of picture, the driving circuit transfers the common electrode signal to the first touch driving electrode group 101 and the second touch driving electrode group 102, while during a touch period in the display time for the even frame of picture, the driving circuit applies the touch scan signal only to the second touch driving electrode group 101, the touch sensing electrodes 4 couple the voltage signal of the touch scan signal and output the coupled voltage signals. Thus, the touch detection on all of the touch detection points is completed in the display time for the two consecutive frames of pictures.

Further, in the present embodiment, each of the touch driving electrodes 3 may be configured to be arranged in a row direction of the pixel units, while each of the touch sensing electrodes 4 may be configured to be arranged in a column direction of the pixel units, so that the touch driving electrodes 3 and the touch sensing electrodes 4 are realized to be disposed as being intersected horizontally and vertically. In an example, the first touch driving electrode group 101 comprises all of the touch driving electrodes 301 in odd rows, while the second touch driving electrode group 102 comprise all of the touch driving electrodes 302 in even rows, as illustrated in FIG. 3. The touch detection is performed on the touch detection points corresponding to all of the touch driving electrodes 301 in the odd rows during the touch period in the display time for the odd frame of picture, while the touch detection is performed on the touch detection points corresponding to all of the touch driving electrodes 302 in the even rows during the touch period in the display time for the even frame of picture. A detection precision of the touch screen generally has an order of millimeter, therefore it may be deemed that the detection is substantively preformed on a same location region in the display time for each of the two frames of pictures, which may avoid misreporting of the touch points caused by high-frequency noise effectively.

In an example, during the touch period in the display time for the odd frame of picture, the touch scan signal is applied to the respective touch driving electrodes in the first touch driving electrode group 101 sequentially, the touch sensing electrodes 4 couple the voltage signal of the touch scan signal and output the coupled voltage signals, so that touch sensing voltage signals corresponding to the respective touch driving electrodes are acquired.

In an example, during the touch period in the display time for the even frame of picture, the touch scan signal is applied to the respective touch driving electrodes in the second touch driving electrode group 102 sequentially, the touch sensing electrodes 4 couple the voltage signal of the touch scan signal and output the coupled voltage signals, so that touch sensing voltage signals corresponding to the respective touch driving electrodes are acquired.

Further, in order to reduce a frame width of an entire display module, each of the touch driving electrodes (comprising all of the touch driving electrodes 301 in the odd rows and all of the touch driving electrodes 302 in the even rows) is electrically connected with a drain of a corresponding switching thin film transistor 7 in the present embodiment, as illustrated in FIG. 3, the switching thin film transistor 7 may be formed in a same layer as the thin film transistors in the pixel unit on the array substrate 1 and its drain may be electrically connected with the touch driving electrode via a through hole (not shown in FIG. 1) in connection with FIG. 1. Further, the driving circuit is configured to comprise a touch switching driving circuit 11 and a touch scan driving circuit 12, the touch switching driving circuit 11 is used for transferring a touch switching signal to the gates of the respective switching thin film transistors 7 so as to control turning on and off of the switching thin film transistors 7. Sources of two switching thin film transistors 7 corresponding to the touch driving electrode 301 in the odd row and the touch driving electrode 302 in the even row, which are adjacent, respectively, are electrically connected with each other and share one touch scan line 13, which may decrease wirings of the touch scan lines in half and reduce the frame width occupied by them. The touch scan driving circuit 12 is connected with the touch scan lines 13, and is used for transferring the touch scan signal to the respective touch driving electrodes in the first touch driving electrode group 101 sequentially when the switching thin film transistors 7 corresponding to the first touch driving electrode group 101 are turned on during the touch period in the display time for the odd frame of picture while transferring the touch scan signal to the respective touch driving electrodes in the second touch driving electrode group 102 sequentially when the switching thin film transistors 7 corresponding to the second touch driving electrode group 102 are turned on during the touch period in the display time for the even frame of picture. In an example, the gates of the switching thin film transistors 7 corresponding to all of the touch driving electrodes 301 in the odd rows are configured to share a first touch switching line 15, while the gates of the switching thin film transistors 7 corresponding to all of the touch driving electrodes 302 in the even rows are configured to share a second touch switching line 16. Thus, the switching thin film transistors 7 corresponding to all of the touch driving electrodes 301 in the odd rows may be controlled to be turned on only by the touch switching signal on the first touch switching line 15 in the display time for the odd frame of picture, and the switching thin film transistors 7 corresponding to all of the touch driving electrodes 302 in the even rows may be controlled to be turned on only by the touch switching signal on the second touch switching line 16 in the display time for the even frame of picture, which may further decrease the wirings of the touch switching lines.

In the present embodiment, the respective switching thin film transistors 7 are disposed outside the touch area and the display area in order not to affect an aperture ratio of the display screen.

Embodiment 2

Based on a same inventive conception, in the present embodiment, there is provided a display device comprising the touch screen of Embodiment 1. Since the touch detection is performed on only a part of the touch detection points in the display time for one frame of picture, the charging time of the pixel units in the display time for one frame of picture is increased and the design difficulty of the pixel units is reduced, which may ensure a display quality of the display device.

Embodiment 3

Correspondingly, in the present embodiment, there is provided a driving method for the touch screen in the Embodiment 1 in which a plurality of touch driving electrodes are grouped into a plurality of touch driving electrode groups in accordance with a certain rule, the driving method comprises the following steps.

At step S1, a display time for one frame of picture on the touch screen is divided into a display period and a touch period.

At step S2, during the display period in the display time for the one frame of picture, a common electrode signal is applied to each of the touch driving electrodes in the touch screen; and during the touch period in the display time for the one frame of picture, a touch scan signal is only applied to the respective touch driving electrodes in one of the touch driving electrode groups sequentially and the touch sensing electrodes couple the voltage signal of the touch scan signal and output the coupled voltage signal.

In an example, the plurality of touch driving electrodes are grouped into two touch driving electrode groups in order to complete the touch detection on all of the touch detection points in the display time for two consecutive frames of pictures and ensure the touch detection precision. In particular, each of the touch driving electrodes may be arranged in a row direction of the pixel units, and then all of the touch driving electrodes in odd rows are grouped as the first touch driving electrode group and all of the touch driving electrodes in even rows are grouped as the second touch driving electrode group.

Specifically, a low level signal may further be applied to the touch sensing electrodes during the display period in the display time for the one frame of picture, in order not to affect a picture quality.

In order to ensure the touch detection precision, it is benefit to complete the touch detection on all of the touch detection points in the display time for two consecutive frames of pictures, that is to say, the plurality of touch driving electrodes are grouped into a first touch driving electrode group and a second touch driving electrode group in accordance with a certain rule, then in the display time for the two consecutive frames of pictures:

the common electrode signal is applied to each of the touch driving electrodes in the touch screen while the low level signal is applied to the touch sensing electrodes during the display period in the display time for the one frame of picture; the touch scan signal is only applied to the respective touch driving electrodes in the first touch driving electrode group sequentially while the touch sensing electrodes couple the voltage signal of the touch scan signal and output the coupled voltage signals during the touch period in the display time for this frame of picture; and the common electrode signal is applied to each of the touch driving electrodes in the touch screen while the low level signal is applied to the touch sensing electrodes during the display period in the display time for the next frame of picture; the touch scan signal is only applied to the respective touch driving electrodes in the second touch driving electrode group sequentially while the touch sensing electrodes couple the voltage signal of the touch scan signal and output the coupled voltage signals during the touch period in the display time for this frame of picture.

There are many manners for grouping the plurality of touch driving electrodes into two touch driving electrode groups, and in the present embodiment, each of the touch driving electrodes may be arranged in the row direction of the pixel units, and all of the touch driving electrodes in odd rows are grouped as the first touch driving electrode group and all of the touch driving electrodes in even rows are grouped as the second touch driving electrode group. A detection precision of the touch screen generally has an order of millimeter, therefore it may be deemed that the detection is substantively preformed on a same location region in the display time for each of the two frames of pictures, which may avoid misreporting of the touch points caused by high-frequency noise effectively.

According to the embodiment of the present disclosure, in an example, during the display period in the display time for the odd frame of picture, the common electrode signal is applied to each of the touch driving electrodes in the touch screen while the low level signal is applied to the touch sensing electrodes; during the touch period in the display time for the odd frame of picture, the touch scan signal is applied to the respective touch driving electrodes in the first touch driving electrode group sequentially, the touch sensing electrodes couple the voltage signal of the touch scan signal and output the coupled voltage signals, meanwhile the low level signal may be applied to all of the touch driving electrodes in the even rows, which may reduce the interference to the touch detection on the touch detection points corresponding to this first touch driving electrode group; and during the display period in the display time for the even frame of picture, the common electrode signal is applied to each of the touch driving electrodes in the touch screen while the low level signal is applied to the touch sensing electrodes; during the touch period in the display time for the even frame of picture, the touch scan signal is applied to the respective touch driving electrodes in the second touch driving electrode group sequentially, the touch sensing electrodes couple the voltage signal of the touch scan signal and output the coupled voltage signal, meanwhile the low level signal may be applied to all of the touch driving electrodes in the odd rows, which may reduce the interference to the touch detection on the touch detection points corresponding to this second touch driving electrode group.

According to the embodiment of the present disclosure, the interference to a touch process may be avoided by turning off the thin film transistors in the pixel unit, or also may be avoided by making no signals input on the data lines and the gate lines, during the touch period.

In order to decrease the wirings, in the present embodiment, each of the touch driving electrodes (comprising the touch driving electrodes in the odd rows and the touch driving electrodes in the even rows) is electrically connected with the drain of the corresponding switching thin film transistor, and the sources of two switching thin film transistors corresponding to a touch driving electrode in the odd row and a touch driving electrode in the even row, which are adjacent, respectively, are electrically connected with each other and share one touch scan line, which may decrease the wirings of the touch scan lines.

Correspondingly, in the embodiment of the present disclosure, during the touch periods in the display time for two consecutive frames of pictures, the driving method for the touch screen comprises steps as follows: the switching thin film transistors corresponding to all of the touch driving electrodes in the odd rows are controlled to be turned on and the touch scan signal is transferred to the respective touch driving electrodes in the first touch driving electrode group through the touch scan lines sequentially during the touch period in the display time for the odd frame of picture; the switching thin film transistors corresponding to all of the touch driving electrodes in the even rows are controlled to be turned on and the touch scan signal is transferred to the respective touch driving electrodes in the second touch driving electrode group through the touch scan lines sequentially during the touch period in the display time for the even frame of picture.

In order to further decrease the wirings, in an example, during the touch period in the display time for the odd frame of picture, the touch switching signal is transferred to the switching thin film transistors corresponding to all of the touch driving electrodes in the odd rows through the first touch switching line so as to turn on the switching thin film transistors corresponding to all of the touch driving electrodes in the odd rows; and during the touch period in the display time for the even frame of picture, the touch switching signal is transferred to the switching thin film transistors corresponding to all of the touch driving electrodes in the even rows through the second touch switching line so as to turn on the switching thin film transistors corresponding to all of the touch driving electrodes in the even rows, which may decrease the wirings of the touch switching lines.

It can be seen from the above embodiments, in the touch screen, the driving method thereof and the display device provided in the present disclosure, the common electrodes of at least part of the pixel units on the array substrate form the plurality of touch driving electrodes each comprising at least one common electrode; the plurality of touch driving electrodes are grouped into the plurality of touch driving electrode groups each comprising at least one touch driving electrode, and the plurality of touch sensing electrodes are formed on the color filter substrate, the touch driving electrodes and the touch sensing electrodes are disposed to be intersected horizontally and vertically, coupling capacitors are formed at the intersections, and each of the coupling capacitors corresponds to a touch detection point. Further, the driving circuit is further provided, so that during the display period in the display time for the one frame of picture, the driving circuit transfers the common electrode signal to all of the touch driving electrodes in order that the picture is displayed, while during the touch period in the display time for the one frame of picture, the driving circuit only transfers the touch scan signal to the respective touch driving electrodes in one of the touch driving electrode groups sequentially in order to perform touch detection on touch detection points corresponding to the touch driving electrode group, and the touch sensing electrodes are used for coupling the voltage of the touch scan signal and outputting the coupled voltage signal, thus a position of a touch point may be determined by detecting the voltage signal. The touch detection is performed on only the touch detection points corresponding to one of the touch driving electrode groups in the display time for the one frame of picture, therefore the charging time of the pixel units in the display time for the one frame of picture is increased and the design difficulty of the pixel units is reduced.

Above implementations are only preferable implementations, and it should note that, for those ordinary skilled in the art, many improvements and replacements may be made without departing from the principle of the present disclosure, and such improvements and replacements shall be included in the protection scope of the present disclosure.

What is claimed is:

1. A touch screen comprising a color filter substrate, an array substrate and a liquid crystal layer disposed between the array substrate and the color filter substrate, a plurality of pixel units which are arranged in a matrix are formed on the array substrate, the pixel unit comprises thin film transistors, a pixel electrode and a common electrode, characterized in that the common electrodes of at least part of the plurality of the pixel units on the array substrate constitute a plurality of touch driving electrodes each comprising at least one common electrode; the plurality of the touch driving electrodes are grouped into a plurality of touch driving electrode groups each comprising at least one touch driving electrode; and a plurality of touch sensing electrodes are formed on the color filter substrate;

wherein the touch driving electrode and the touch sensing electrodes are disposed to be intersected horizontally and vertically;

wherein, in a display time for one frame of picture, only one of the touch driving electrode groups is scanned for touch detection;

wherein the touch screen further comprises a driving circuit for transferring a common electrode signal to all of the touch driving electrodes during a display period in a display time for said one frame of picture, and only transferring a touch scan signal to the respective touch driving electrodes in said one of the touch driving electrode groups sequentially during a touch period in the display time for said one frame of picture, wherein touch detections fro adjacent two of the touch driving electrode groups are temporally spaced by one display period in the display time for one frame of picture.

2. The touch screen of claim 1, characterized in that the plurality of touch driving electrodes are grouped into a first touch driving electrode group and a second touch driving electrode group, wherein, for two consecutive frames of picture including a first frame of picture and a second frame of picture, only the first touch driving electrode group is scanned for touch detection during a touch period in a display time for the first frame of picture, and only the second touch driving electrode group is scanned for touch detection during a touch period in a display time for the second frame of picture;

during a display period in the display time for the first frame of picture, the driving circuit transfers a common electrode signal to all of the touch driving electrode;

during the touch period in the display time for the first frame of picture, the driving circuit transfers a touch scan signal to the respective touch driving electrodes in the first touch driving electrode group sequentially;

during a display period in the display time for the second frame of picture, the driving circuit transfers a common electrode signal to all of the touch driving electrode;

during the touch period in the display time for the second frame of picture, the driving circuit transfers a touch scan signal to the respective touch driving electrodes in the second touch driving electrode group sequentially.

3. The touch screen of claim 2, characterized in that each of the touch driving electrodes is arranged in a row direction of the pixel units, while each of the touch sensing electrodes is arranged in a column direction of the pixel units; the first touch driving electrode group comprises all of the touch driving electrodes in odd rows; while the second touch driving electrode group comprise all of the touch driving electrodes in even rows.

4. The touch screen of claim 3, characterized in that each of the touch driving electrodes is electrically connected with a drain of a corresponding switching thin film transistor; sources of two switching thin film transistors corresponding to a touch driving electrode in the odd row and a touch driving electrode in the even row, which are adjacent, respectively, are electrically connected with each other and share one touch scan line;

the driving circuit comprises a touch switching driving circuit and a touch scan driving circuit;

the touch switching driving circuit is connected with gates of the respective switching thin film transistors and is used for transferring a touch switching signal to the gates of the respective switching thin film transistors to control turning on and off the switching thin film transistors;

the touch scan driving circuit is connected with the touch scan lines, and transfers the common electrode signal to all of the touch driving electrodes during the displaying periods in the display time for two consecutive frames of pictures while transfers the touch scan signal to the respective touch driving electrodes in the first touch driving electrode group sequentially during the touch period in the display time for one of the two consecutive frames of pictures and transfers the touch scan signal to the respective touch driving electrodes in the second touch driving electrode group sequentially during the touch periods in the display time for the other of the two consecutive frames of pictures.

5. The touch screen of claim 4, characterized in that the gates of the switching thin film transistors corresponding to all of the touch driving electrodes in the odd rows share a first touch switching line; while the gates of the switching thin film transistors corresponding to all of the touch driving electrodes in the even rows share a second touch switching line.

6. A display device, characterized by comprising the touch screen of claim 1.

7. The display device of claim 6, characterized in that the plurality of touch driving electrodes are grouped into a first touch driving electrode group and a second touch driving electrode group.

8. The display device of claim 7, characterized in that each of the touch driving electrodes is arranged in a row direction of the pixel units, while each of the touch sensing electrodes is arranged in a column direction of the pixel units; the first touch driving electrode group comprises all of the touch driving electrodes in odd rows; while the second touch driving electrode group comprise all of the touch driving electrodes in even rows.

9. The display device of claim 8, characterized in that each of the touch driving electrodes is electrically connected with a drain of a corresponding switching thin film transistor; sources of two switching thin film transistors corresponding to a touch driving electrode in the odd row and a touch driving electrode in the even row, which are adjacent, respectively, are electrically connected with each other and share one touch scan line;

the driving circuit comprises a touch switching driving circuit and a touch scan driving circuit;

the touch switching driving circuit is connected with gates of the respective switching thin film transistors and is used for transferring a touch switching signal to the gates of the respective switching thin film transistors to control turning on and off the switching thin film transistors;

the touch scan driving circuit is connected with the touch scan lines, and transfers the common electrode signal to all of the touch driving electrodes during the displaying periods in the display time for two consecutive frames of pictures while transfers the touch scan signal to the respective touch driving electrodes in the first touch driving electrode group and the second touch driving electrode group sequentially, respectively, during the touch periods in the display time for the two consecutive frames of pictures.

10. The display device of claim 9, characterized in that the gates of the switching thin film transistors corresponding to all of the touch driving electrodes in the odd rows share a first touch switching line; while the gates of the switching thin film transistors corresponding to all of the touch driving electrodes in the even rows share a second touch switching line.

11. A driving method for the touch screen of claim 1 in which a plurality of touch driving electrodes are grouped into a plurality of touch driving electrode groups in accordance with a certain rule, the driving method comprises:
dividing a display time for one frame of picture on the touch screen into a display period and a touch period;
during the display period in the display time for said one frame of picture, applying a common electrode signal to each of the touch driving electrodes in the touch screen and applying a low level signal to the touch sensing electrodes; and
during the touch period in the display time for said one frame of picture, only applying a touch scan signal to the respective touch driving electrodes in said one of the touch driving electrode groups sequentially, and the touch sensing electrodes coupling the voltage signal of the touch scan signal and outputting the coupled voltage signal.

12. The driving method for the touch screen of claim 11, characterized in that the plurality of touch driving electrodes are grouped into a first touch driving electrode group and a second touch driving electrode group in accordance with the certain rule;
wherein, in the display time for two consecutive frames of pictures: the common electrode signal is applied to each of the touch driving electrodes in the touch screen while the low level signal is applied to the touch sensing electrodes during the display period in the display time for the first frame of picture;
the touch scan signal is only applied to the respective touch driving electrodes in the first touch driving electrode group sequentially while the touch sensing electrodes couple the voltage signal of the touch scan signal and output the coupled voltage signals during the touch period in the display time for the first frame of picture;
the common electrode signal is applied to each of the touch driving electrodes in the touch screen while the low level signal is applied to the touch sensing electrodes during the display period in the display time for the second frame of picture;
the touch scan signal is only applied to the respective touch driving electrodes in the second touch driving electrode group sequentially while the touch sensing electrodes couple the voltage signal of the touch scan signal and output the coupled voltage signal during the touch period in the display time for the second frame of picture.

13. The driving method for the touch screen of claim 12, characterized in that in the touch screen: each of the touch driving electrodes are arranged in a row direction of the pixel units, all of the touch driving electrodes in odd rows are grouped as the first touch driving electrode group and all of the touch driving electrodes in even rows are grouped as the second touch driving electrode group.

14. The driving method for the touch screen of claim 13, wherein in the touch screen, each touch driving electrode is electrically connected with a drain of a corresponding switching thin film transistor, sources of two switching thin film transistors corresponding to a touch driving electrode in the odd row and a touch driving electrode in the even row, which are adjacent, respectively, are electrically connected with each other and share one touch scan line;

characterized in that, in the driving method, in the display time for two consecutive frames of pictures, the switching thin film transistors corresponding to all of the touch driving electrodes in the odd rows are controlled to be turned on and the touch scan signal is transferred to the respective touch driving electrodes in the first touch driving electrode group through touch scan lines sequentially during the touch period in the display time for the odd frame of picture;

the switching thin film transistors corresponding to all of the touch driving electrodes in the even rows are controlled to be turned on and the touch scan signal is transferred to the respective touch driving electrodes in the second touch driving electrode group through the touch scan lines sequentially during the touch period in the display time for the even frame of picture.

15. The driving method for the touch screen of claim 14, characterized in that during the touch period in the display time for the odd frame of picture, a touch switching signal is transferred to the gates of the switching thin film transistors corresponding to all of the touch driving electrodes in the odd rows through a first touch switching line so as to turn on the switching thin film transistors corresponding to all of the touch driving electrodes in the odd rows; and during the touch period in the display time for the even frame of picture, the touch switching signal is transferred to the gates of the switching thin film transistors corresponding to all of the touch driving electrodes in the even rows through a second touch switching line so as to turn on the switching thin film transistors corresponding to all of the touch driving electrodes in the even TOWS.

16. The driving method for the touch screen of claim 14, characterized in that the gates of the switching thin film transistors corresponding to all of the touch driving electrodes in the odd rows share a first touch switching line; while the gates of the switching thin film transistors corresponding to all of the touch driving electrodes in the even rows share a second touch switching line.

* * * * *